United States Patent Office 3,478,227
Patented Nov. 11, 1969

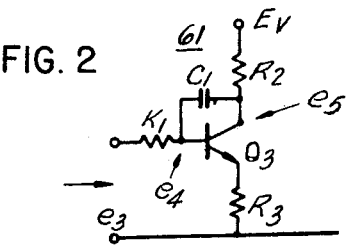
FIG. 2
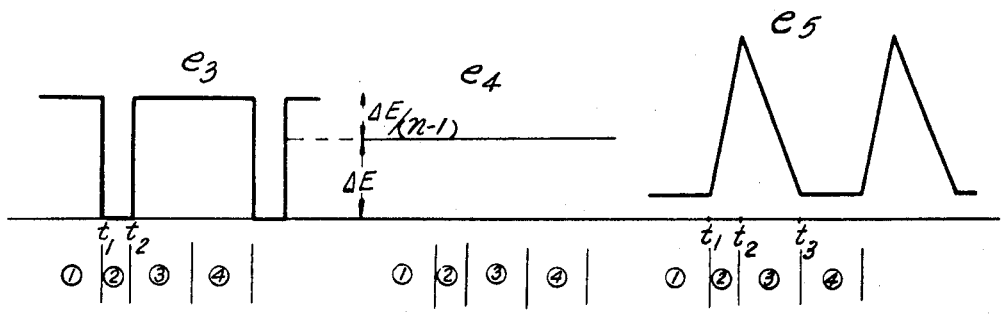
FIG. 3
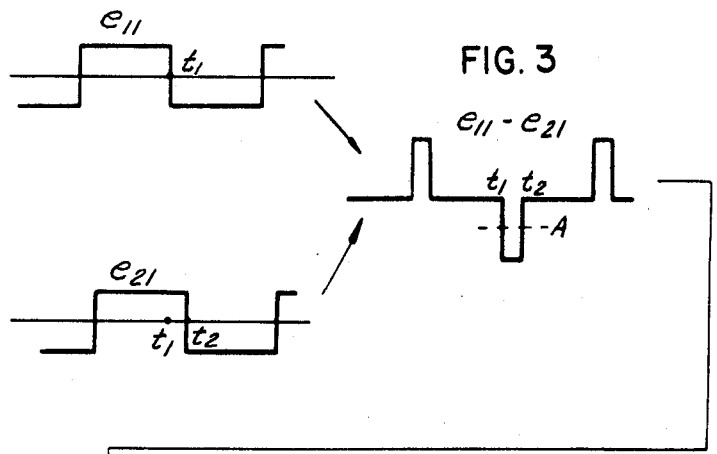
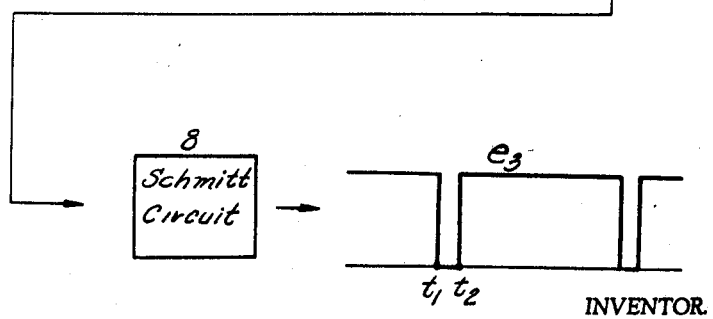
INVENTOR.
HARUO ITO

3,478,227
PHASE SHIFTING CIRCUIT
Haruo Ito, Tokyo, Japan, assignor to Yokogawa-Hewlett-Packard, Ltd., Tokyo, Japan, a corporation of Japan
Filed Oct. 7, 1966, Ser. No. 585,114
Claims priority, application Japan, Oct. 30, 1965, 40/66,576
Int. Cl. H03k 5/20
U.S. Cl. 307—232       2 Claims

ABSTRACT OF THE DISCLOSURE

A phase-shifting circuit produces a signal having an $n\theta$ phase angle from a signal having a phase angle $\theta$ in relation to a signal of standard phase. This is accomplished by selectively switching a trigger circuit on the slope of the output wave of an integrator which is activated between two integrating conditions in response to a pulse signal having a pulse width representative of the phase delay $\theta$.

---

Other and incidental objects of the present invention will be apparent from a reading of this specification and an inspection of the accompanying drawings in which:

FIGURE 2 is a waveform diagram for illustrating the variation of wave shape on the output time delay; and FIGURE 3 is a waveform diagram for illustrating the operation of a circuit substitution for the half-wave rectifier circuit 4.

Figure 1:
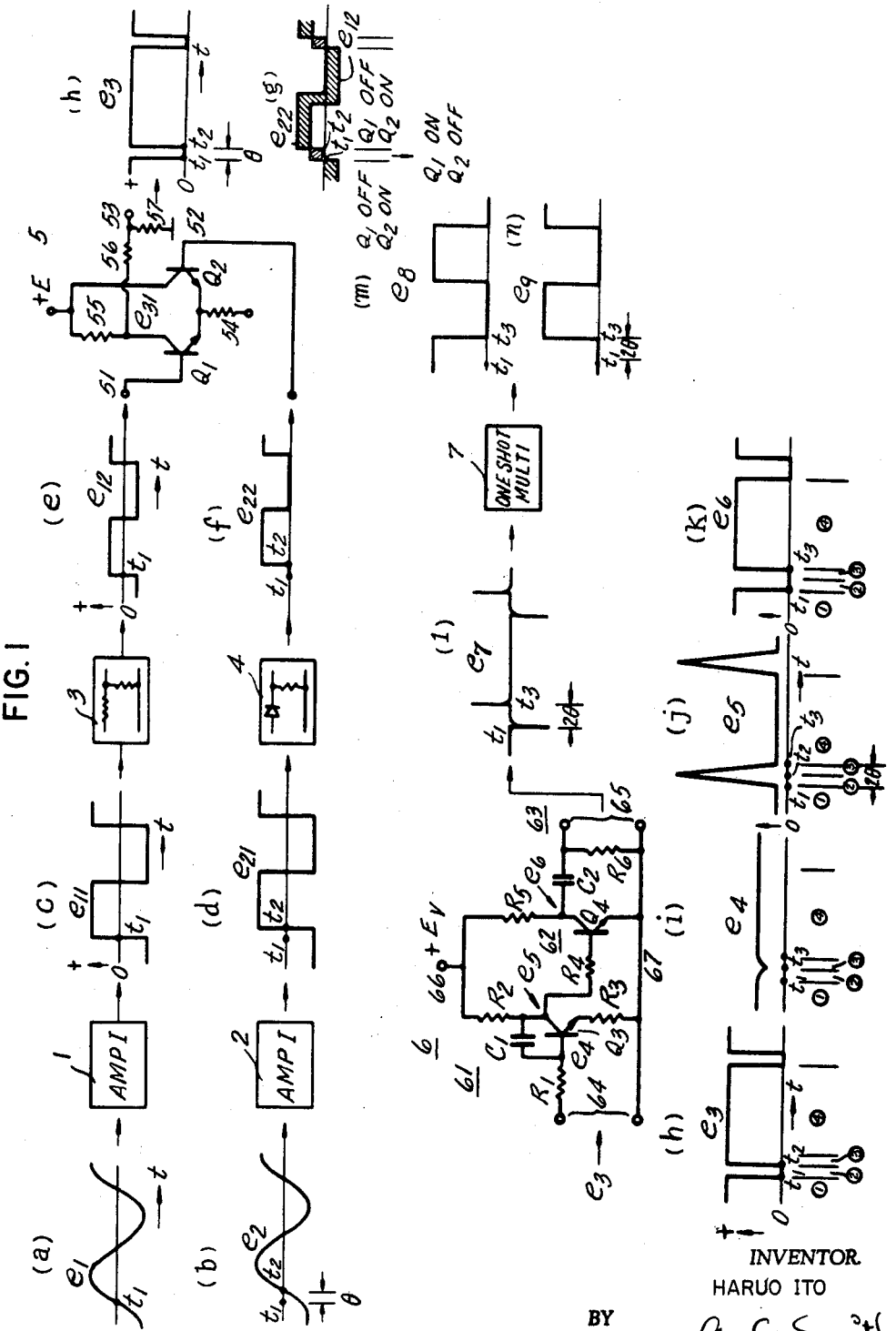
FIGURE 1 is a combined schematic and waveform diagram for illustrating the operating embodiment of the present invention.

Referring now to the figures of the drawing, a standard phase AC voltage $e_1$ is applied to the input of one wave-shaping amplifier 1 and an AC voltage $e_2$ having a phase delay of $\theta$ relative to $e_1$ is applied to the other wave-shaping amplifier 2. The wave-shaping amplifiers 1 and 2 produce square waves $(c)$ and $(d)$, respectively, at the zero crossing of the sine wave $e_1$ at time $t_1$, and at the zero crossing of sine wace $e_2$ at time $t_2$ which is delayed from $t_1$ by phase $\theta$.

The square or rectangular waves $(c)$ and $(d)$ at the outputs of amplifiers 1 and 2 are applied, respectively, to the resistive attenuating circuit 3 and rectifier circuit 4 which transform the waves $(c)$ and $(d)$ into attenuated wave $(e)$ and half-wave rectified wave $(f)$, respectively. The attenuated wave $(e)$ has a peak value that is about one half the peak value of the rectified wave $(f)$. The attenuated and rectified waves $(e)$ and $(f)$ are applied to two input bases 52 and 51 of transistors $Q_1$ and $Q_2$ of phase comparator 5. In the phase comparator 5, for example as in the diagram, the emitters of transistors $Q_1$ and $Q_2$ are commonly connected at one end of resistor 54. The collector of $Q_1$ is connected to the positive terminal of the common power source through resistor 55 and the collector of $Q_2$ is directly connected to this positive terminal. In operation, $Q_1$ is switched from OFF condition to ON condition at the moment $t_1$ when wave $(e)$ changes from negative to positive. The wave $(f)$ is applied to $Q_2$ after a delay of $\theta$, and at the moment this wave grows larger than the peak amplitude of wave $(e)$, $Q_1$ is switched back to OFF. The collector voltage $e_{31}$ of $Q_1$ thus produced is attenuated by the attenuator consisting of resistors 56 and 57 and appears as wave $e_3$ at output terminal 53. FIGURE 1$(g)$ illustrates the relation between the two voltage waves $(e)$ and $(f)$ applied to the inputs of comparator 5 and the operations of transistors $Q_1$ and $Q_2$. The signal $e_3$ having a waveform as shown in FIGURE 1$(h)$ is applied to input 64 of pulse generator circuit 6 which includes a Miller integrating circuit 61 that consists of transistor $Q_3$, an emitter resistor $R_3$, collector resistor $R_2$, resistor $R_1$ serially connected to base, and capacitor $C_1$ connected between base and collector. The Miller integrating circuit is followed by a switch circuit 62 which consists of transistor $Q_4$ and resistor $R_4$ (placed between the collector of said transistor $Q_3$ and the base of transistor $Q_4$), and collector resistor $R_5$. A differentiation circuit 63 including capacitor $C_2$ and a resistor $R_6$ serially connected between the collector of transistor $Q_4$ and a reference potential with one output terminal 65 connected to the common connection of the capacitor $C_2$ and resistor $R_6$. The signal $e_3$ is converted to a pulse voltage $(l)$ as follows: During the time interval ①, transistor $Q_3$ is ON in the saturated condition. Under this condition, the circuit constants of the comparison circuit 5 and circuit 61 are selected to provide a base voltage $e_4$ at transistor $Q_3$ which is one half the value of $e_3$. Assuming that $E_v$ represents the voltage between power supply terminals 66 and 67 of circuit 61, $e_5$ of $Q_3$ at saturation is approximately equal to $$\frac{R_3}{R_2+R_3}E_v$$

and when this voltage is applied to the input of switch circuit 62, $Q_4$ is in the OFF condition. During time interval ② when the amplitude of $e_3$ drops, $e_4$ begins to decrease toward the value of $e_3$ with a time constant of $R_1 \times \mu C_1$ ($\mu$ represents voltage amplification of $Q_3$ circuit). This voltage variation appears at the collector side of $Q_3$, amplified by $\mu$, and the collector voltage $e_5$ of $Q_3$ will increase in linear proportion. During the time interval ② as $e_5$ increases $Q_4$ switches from OFF to ON at time $t_2$ which is a short time after time $t_1$. Then at $t_2$, the beginning of time interval ③ when $e_3$ rises again to the maximum value, $e_4$ begins to rise toward the maximum value of $e_3$ with a time constant of $R_1 \times \mu C_1$. When $e_3$ rises to a value which switches $Q_3$ to the ON saturated condition, the current in $R_1$ suddenly rises and $e_4$ stops increasing and settles at a constant voltage. During the time interval ③, $e_4$ is amplified by $\mu$ and appears as $e_5$ at the collector electrode of $Q_3$. The direction of variations of $e_5$ is opposite that of $e_4$, as shown in FIGURE 1$(j)$, and switches $Q_4$ to OFF just before it decreases to the constant value.

$$\frac{R_3}{R_2+R_3}E_v$$

When $\mu$ is large, the variation in $e_4$ is negligibly small compared with the variation of $e_3$. Thus, under the condition that the voltage of $e_4$ (when transistor $Q_3$ is ON and saturated) is one half the voltage of $e_3$, as stated above, the variations of $e_3$ (in relation to $Q_3$'s base electrode) at times $t_1$ and $t_2$ are substantially equal in amplitude and opposite in direction. Therefore, the decreasing change in amplitute of $e_4$ in time interval ② is equal to the increasing change in time interval ③, the time intervals ② and ③ are equal and the time interval between $t_1$ (when transistor $Q_4$ of switch circuit 62 switches from OFF to ON) and $t_3$ (when $Q_4$ returns to OFF) is twice the time interval ② between $t_1$ and $t_2$. The output signal of switch circuit 62 is differentiated by differentiation circuit 63 to produce a negative pulse at output terminal 65 at time $t_1$ and a positive pulse at time $t_3$ at a delay of $2\theta$ from $t_1$. Actually as transistor $Q_4$ switches to OFF slightly before $t_3$ the positive pulse of $e_7$ is also generated at that time, but the time lag is negligible in relation to $\theta$.

The positive pulse that occurs at the output of pulse generating circuit 6 may be utilized as a trigger to drive monostable multivibrator 7 to produce repeat signal $e_8$ and the complementary signal $e_9$ at its outputs. Alternating current signal $e_9$ has a phase delay of $2\theta$ in relation to signal $e_1$ of standard phase.

In the example so far explained, the circuit is given an alternating signal $e_2$ having a phase delay of $\theta$ relative to standard phase signal $e_1$ and generates a signal having a phase delay of $2\theta$ relative to $e_1$. However, FIGURE 2 illustrates a case where $e_1$ and $e_2$ are given and a signal having a phase delay generally of $n\theta$ (where $n$ is an optional constant) may be generated. It is assumed that the voltage amplification $\mu$ of transistor $Q_3$ of integrating circuit 61 is large and that the voltage $e_4$ of base electrode is maintained approximately constant. The circuit constant may then be selected such that the voltage difference between $e_3$ and $e_4$ in time interval ② is $\Delta E$, and the voltage difference between $e_3$ and $e_4$ in time interval ③ is $\Delta E/(n-1)$. Therefore, the ratio of the decreasing change of voltage $e_5$ (which occurs at collector electrode of $Q_3$) to its increasing change in time interval ② is $1/(n-1)$. Consequently, the time interval ③ is $(n-1)$ times the time interval ②. Thus, is the time interval between $t_1$ and $t_2$ is $\theta$, the time interval between $t_1$ and $t_3$ is $n\theta$.

The example so far explained rectangular wave signal $e_{11}$ of standard phase and rectified wave $e_{22}$ of rectangular wave signal $e_{21}$ having a phase difference of $\theta$ relative to it are applied to phase comparator 5 to produce the rectangular wave of desired time lag. But instead of using rectifier 4 and phase comparator 5, waveform $e_3$ similar to the case of FIGURE 1 may be obtained, as shown in FIGURE 3, by adjusting $e_{11}$ and $e_{12}$ to approximately the same voltages, producing a waveform as the difference between $e_{11}$ and $e_{21}$, and limiting it to level A using a Schmitt trigger circuit 8.

I claim:
1. A signalling circuit comprising: first and second sources of signal of selected phase separation; means producing a standard pulse signal having a pulse width representative of said selected phase separation; an integrator; means connecting said integrator to receive said pulse signal for producing an output which varies in amplitude with time at a rate related to signal applied thereto; and a signal-controlled switch means connected to receive said output from the integrator for producing an output signal at a change of conductivity of said switch means in response to the output of said integrator attaining a selected value.

2. A signalling circuit as in claim 1 wherein said means producing said pulse signal includes apparatus for shaping square waves from the signals from the first and second sources with the transitions between the peak values of each of said square waves separated by said selected phase separation; a differential amplifier; and means connected to inputs of said differential amplifier for applying said square waves thereto to produce said pulse signal at the output thereof having a pulse width equal to said selected phase separation.

References Cited
UNITED STATES PATENTS

| | | | |
|---|---|---|---|
| 2,451,824 | 10/1948 | Guanella et al. | 332—9 |
| 3,073,972 | 1/1963 | Jenkins | 307—232 |
| 3,219,938 | 11/1965 | Greening | 328—128 XR |
| 3,315,101 | 4/1967 | Smith | 328—128 XR |

FOREIGN PATENTS

| | | |
|---|---|---|
| 134,759 | 10/1949 | Australia. |
| 641,982 | 8/1950 | Great Britain. |

JOHN S. HEYMAN, Primary Examiner

S. T. KRAWCZEWICZ, Assistant Examiner

U.S. Cl. X.R.

307—262; 328—128, 133